(12) United States Patent
Sauer et al.

(10) Patent No.: US 11,436,452 B2
(45) Date of Patent: Sep. 6, 2022

(54) SYSTEM AND METHOD FOR LABEL AUGMENTATION IN VIDEO DATA

(71) Applicants: TOYOTA MOTOR EUROPE, Brussels (BE); CAMBRIDGE ENTERPRISE LIMITED, Cambridgeshire (GB)

(72) Inventors: Patrick Sauer, Brussels (BE); Ignas Budvytis, Cambridgeshire (GB); Roberto Cipolla, Cambridgeshire (GB)

(73) Assignees: TOYOTA MOTOR EUROPE, Brussels (BE); CAMBRIDGE ENTERPRISE LIMITED, Cambridgeshire (GB)

( * ) Notice: Subject to any disclaimer, the term of this patent is extended or adjusted under 35 U.S.C. 154(b) by 0 days.

(21) Appl. No.: 16/796,044

(22) Filed: Feb. 20, 2020

(65) Prior Publication Data
US 2020/0184285 A1    Jun. 11, 2020

Related U.S. Application Data

(63) Continuation of application No. PCT/EP2017/071391, filed on Aug. 24, 2017.

(51) Int. Cl.
G06K 9/62    (2006.01)
G06K 9/00    (2006.01)
G06K 9/46    (2006.01)

(52) U.S. Cl.
CPC ....... *G06K 9/6296* (2013.01); *G06K 9/00744* (2013.01); *G06K 9/4638* (2013.01); *G06K 9/6256* (2013.01); *G06K 9/6277* (2013.01)

(58) Field of Classification Search
None
See application file for complete search history.

(56) References Cited

U.S. PATENT DOCUMENTS

2003/0222991 A1*  12/2003  Muammar ............... H04N 1/62
                                                    348/222.1
2006/0110043 A1*  5/2006  Reissman ............ G06K 9/6253
                                                    382/203

(Continued)

FOREIGN PATENT DOCUMENTS

CN    102150425 A  *  8/2011  ........... H04N 19/436
EP    2395456 A1    12/2011

(Continued)

OTHER PUBLICATIONS

Badrinarayanan Vijay et al, "Semi-Supervised Video Segmentation Using Tree Structured Graphical Models", IEEE Transactions on Pattern Analysis and Machine Intelligence, IEEE Computer Society, USA, vol. 35, No. 11, Nov. 2013, pp. 2751-2764.

(Continued)

*Primary Examiner* — Mohammed Rachedine
(74) *Attorney, Agent, or Firm* — Dinsmore & Shohl LLP

(57) ABSTRACT

A method for processing video data comprising a plurality of image frames, the method comprising: obtaining a forward model and a backward model of the plurality of image frames; processing the forward model and the backward model to propagate at least one label in the region or patch to at least one other image frame of the video sequence, using a probabilistic method for estimating the label in the at least one other image frame in forward and backward correspondences, wherein, during the processing, a pixel having a most likely label with a probability lower than a threshold value is assigned a predetermined generic label; and generating a labelled result for any given image frame by applying an image label difference, based on label uncertainty between the forward and backward correspondences, to the given image frame.

18 Claims, 5 Drawing Sheets

(56) References Cited

U.S. PATENT DOCUMENTS

2008/0212873 A1\* 9/2008 Allen .................. G06T 9/20
382/162
2013/0084008 A1\* 4/2013 Othmezouri ......... G06K 9/6297
382/180

FOREIGN PATENT DOCUMENTS

| FR | 2947134 A1 \* | 12/2010 | ............ H04N 19/52 |
| WO | WO-2010033508 A1 \* | 3/2010 | ............... G16B 5/00 |
| WO | WO-2012063107 A1 \* | 5/2012 | ........... G06T 7/0012 |
| WO | WO-2013072543 A1 \* | 5/2013 | ......... G06K 9/00127 |

OTHER PUBLICATIONS

Sudheendra Vijayanarasimhan et al, "Active Frame Selection for Label Propagation in Videos", Oct. 7, 2012, Computer Vision ECCV 2012, Springer Berlin Heidelberg, Berlin, Heidelberg, pp. 496-509.
Badrinarayanan Vijay et al, "Mixture of Trees Probabilistic Graphical Model for Video Segmentation", International Journal of Computer Vision, Kluwer Academic Publishers, Norwell, US, vol. 110, No. 1, Dec. 13, 2013, pp. 14-29.
International Search Report for International Application No. PCT/EP2017/071391 dated May 24, 2018.

\* cited by examiner

SYSTEM AND METHOD FOR LABEL AUGMENTATION IN VIDEO DATA

CROSS-REFERENCE TO RELATED APPLICATION

This application is a National Phase Application of International Application No. PCT/EP2017/071391, filed on Aug. 24, 2017. The entire disclosure of the above application is incorporated herein by reference.

FIELD OF THE DISCLOSURE

The present disclosure relates to systems and methods for labelling of objects or regions in images in video data especially as applied to region or object segmentation in video images. More particularly, the present disclosure relates to semi-automatic or automatic propagation of labels assigned to regions, objects or even pixels therein, a corresponding processing system and the application of such processing.

BACKGROUND OF THE DISCLOSURE

Semantic segmentation is one of the most important sub-problems of autonomous driving. Its progress has been heavily impacted by the developments in the state-of-the-art In image classification and the advances in training and inference procedures as well as architectural innovation in general deep learning.

However, unlike image classification or other general deep learning problems, semantic segmentation (especially for autonomous driving) has rather limited publicly available datasets which do not exceed 5000 labelled frames, although some proprietary datasets may have more. As labelling by hand (i.e., creation of ground-truth labels) takes approximately 1 hour per single frame, alternative methods for obtaining dense labelled data for semantic segmentation must be employed in order to match sizes of standard datasets in other fields.

US 2013/0084008 discloses a method and system for processing video data comprising a plurality of images. The method and system is for obtaining for labelling of a plurality of objects or regions in an image of a sequence of images followed by label propagation to other images in the sequence based on an inference step and a model.

SUMMARY OF THE DISCLOSURE

The present inventors have determined that it remains desirable to enhance accuracy of models for semantic segmentation in difficult or uncommon situations. Increasing the number of semantic classes covered by the model normally requires large amounts of relevant training data which can be costly and time-consuming to produce. Thus, the present inventors address these problems by introducing a method for targeted retraining of such models using automatically generated high quality training data which are created from only a small amount of preselected ground-truth labelled video frames.

Therefore, according to embodiments of the present disclosure, a method for processing video data comprising a plurality of image frames, the plurality of image frames having an earlier and later frame of a video sequence, and having a label for a region or patch in the earlier frame and a corresponding region or patch in the later image frame, is provided. The method includes obtaining a forward model and a backward model of the plurality of image frames, processing the forward model and the backward model to propagate at least one label of the region or patch to at least one other image frame of the video sequence, using a probabilistic method for estimating the label in at least one other image frame in forward and backward correspondences, wherein, during the processing, a pixel having a most likely label with a probability lower than a threshold value is assigned a predetermined generic label, and generating a labelled result for any given image frame by applying an image label difference, based on label uncertainty between the forward and backward correspondences, to the given image frame.

By providing such a method, a label propagation algorithm can be used to achieve an order of magnitude increase in the quantity of available ground truth labels, The chosen label propagation algorithm can handle occlusions and label uncertainty efficiently, which is helpful in avoiding generation of erroneous labelled data.

In addition, because the analysis is now performed at pixel level instead of at a super-pixel level as had been previously done, accuracy is further improved.

Moreover, a first classifier training step is no longer used, and therefore, processor time and energy are saved.

The propagated label may be a class label, or the propagated label may be an instance label.

The plurality of image frames may have a pixel resolution greater than or equal to 960×720.

The forward and backward models may comprise a probabilistic graphical model, for example, a loopy model, a tree model, etc.

The method may comprise, after the processing, assigning pixels within an image frame having no instance label to a background class, dilating the pixels of the background class surrounded by pixels having an assigned instance label into a group of pixels, and reassigning the assigned instance label to the group of pixels when the group of pixels is smaller than a threshold size.

The threshold size may be 40 pixels, 30 pixels, or even 20 pixels.

The video sequence may be a 360 degree (e.g., equirectangular) video sequence.

The 360 degree video sequence may be stored as equirectangular images.

According to further embodiments of the disclosure, use of a plurality zo of labelled result image frames for training an image classifier is provided.

According to yet further embodiments of the disclosure, a system for processing video data comprising a plurality of image frames, the plurality of image frames having an earlier and later frame of a video sequence, having a label for a region or patch in the earlier Image frame and a corresponding region or patch in the later image frame, is provided. The system includes storage means storing a forward model of the plurality of image frames and a backward model of the plurality of image frames, processing means for applying the model to propagate at least one label in the region or patch to at least one other image frame of the video sequence, using a probabilistic method for estimating the label in at least one other image in forward and backward correspondences, wherein the processing means is configured to assign a void label to a pixel having a most likely label with a probability lower than a threshold value, and correcting means for generating a labelled result for any given image frame by applying an image label difference, based on label uncertainty between the forward and backward correspondences, to the given image frame.

The forward model and the backward model may be probabilistic graphical models.

The system may comprise post-processing means configured to assign pixels within an image frame having no instance label to a background class, dilate the pixels of the background class surrounded by pixels having an assigned instance label into a group of pixels, and reassigning the assigned instance label to the group of pixels when the group of pixels is smaller than a threshold size.

It is intended that combinations of the above-described elements and those within the specification may be made, except where otherwise contradictory.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the disclosure and together with the description, and serve to explain the principles thereof.

DESCRIPTION OF THE EMBODIMENTS

Reference will now be made in detail to exemplary embodiments of the disclosure, examples of which are illustrated in the accompanying drawings.

Wherever possible, the same reference numbers will be used throughout the drawings to refer to the same or like parts.

The present disclosure relates to a method for processing video data comprising a plurality of images. The video data thereby may comprise a sequence of images, e.g. indicating the motion of one or more objects in a scene. The video data may be obtained in any suitable way, such as for example by capturing, e.g. using an optical detection or recording system, such as for example a camera, by calling it from a stored position in a memory, etc.

The video data may comprise analogue video data or digital video. The video data may comprise 3 dimensional video data and/or 360 degree video data, for example, filmed using a plurality of interlinked image capture devices.

Video data particularly of interest, although not limiting, may be for example, video data recorded from a moving object, such as for example a moving vehicle. Such data may be of particular interest because one of the applications for processing such data may be the use of video processing for automation and security reasons in vehicles (e.g., driver assistance).

Processing of the video data, as described herein, may be used for example, for recognition and reporting of objects relevant to the moving object, e.g. a vehicle, or to the driver thereof. Objects of interest may be any suitable object, such as, for example, the road, pedestrians, vehicles, obstacles, traffic lights, etc. Processing of the video data may be performed in real-time or may be performed on stored video data.

Methods and systems according to embodiments of the present disclosure do not assume small object displacements or a high video capture frame rate.

Particularly, the present disclosure provides a method of label propagation (i.e., class and/or instance labels) using graphical models constructed forward and backward through the video sequences for label propagation in video sequences. More specifically, the present disclosure provides a means for augmenting the number of labelled training frames for a classifier based on a limited number of ground-truth labelled frames.

Figure 4:
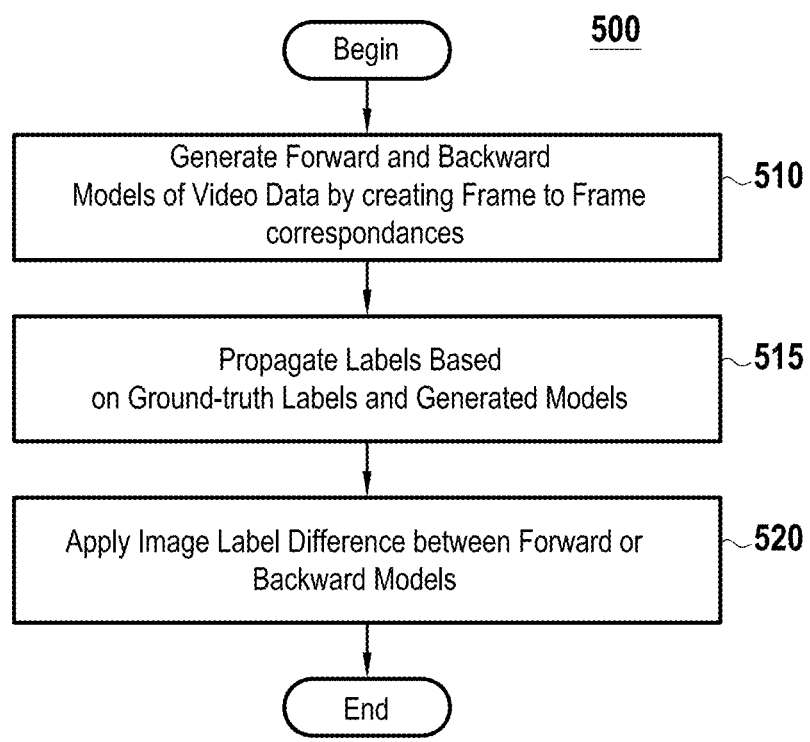
FIG. 4 is a flowchart demonstrating an exemplary method according to embodiments of the present disclosure.

In order to implement methods of the present disclosure, one or more models of a video sequence is created by creating frame-to-frame correspondences, for example, a model based on the forward direction ("a forward model") and a model based on the backward direction ("a backward model") of the video sequence (FIG. 4, step 510).

In creation of such models, a first step may include, matching between a patch in the image and patches in one or more previous or subsequent images may be undertaken. An exemplary matching operation can be described as follows. First a correlation operation of a patch (D×D pixels) in location j of the current frame k is performed in a fixed window around location j−Wj in neighbouring frame k+d. Equation 1a) describes a correlation operation used for finding a best match:

$$T_{k,j} = \mathrm{MATCH}(I_{k,j}, I_{k+d}, w_j) = \mathrm{argmax}_{j' in W_j} \sum_{\forall i, c} (I_{k+d}(p'(i, c)) - I_k(p(i, c))^2$$

where $I_k(p(i, c))$ indicates a pixel i value in a patch p (centred on location j of image $I_k$) in color channel $c \in \{R, G, B\}$ and $I_{k+d}(p'(i, c))$ indicates pixel i value in patch p' (centered around location j' in image $I_{k+d}$ in color channel c).

The models so created may be probabilistic graphical models of a sequence of frames and their labels, for example, forward (d=1) and backward (d=−1) built correspondence trees of propagated labels.

Figure 1A:
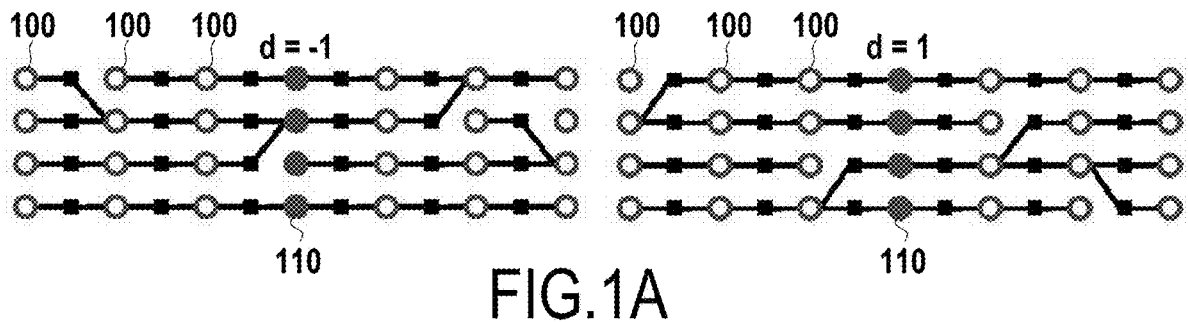
FIG. 1A shows an exemplary factor graph corresponding to the model described, according to embodiments of the present disclosure.

FIG. 1A shows an exemplary factor graph corresponding to the model described, according to embodiments of the present disclosure. According to the exemplary factor graph, in both the backward model (d=−1) and the forward model (d=1) a one-dimensional, four pixel, seven frame k video sequence, where ground-truth labels have been provided for the middle frame 110 only.

Figure 1B:
FIG. 1B shows an exemplary 3-frame video sequence associated with the factor graph of FIG. 1A.

FIG. 1B shows propagation results of forward, backward models as well as combined result using label differencing, which will be discussed below. The bottom left section of this figure shows three images (a) from the Bochum city sequence (CityScapes), of which the middle frame has ground truth labels. Rows (b) and (c) correspondingly show propagation results for d=−1 and d=1 at +10 and −10 frames.

Rows (d) and (e) correspondingly show different outputs produced by averaging and by taking image label differences of labels in (b) and (c), as will be discussed below.

The bottom right section displays several examples of people and car instance labels in row (a). Rows b and c show the propagation result (b) before filling in the labels (c) after filling in the labels.

Figure 2:
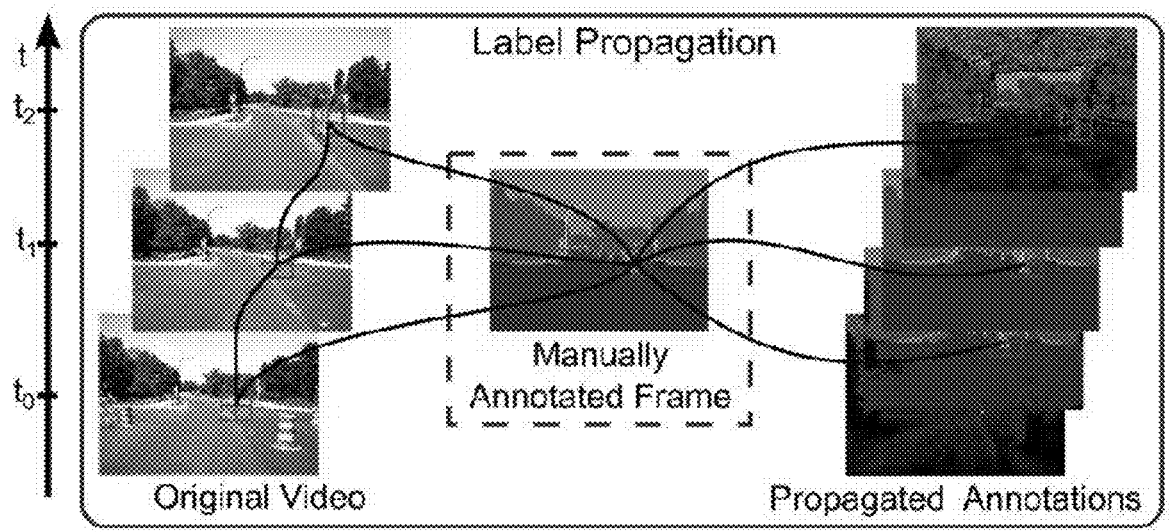
FIG. 2 is a high level depiction of label propagation in a video sequence based on a manually annotated frame.

Effectively, images and labels may be split into overlapping patches, connecting patches from one frame to the next in either a forward or backward direction, using a collection of manually annotated frames as a basis. FIG. 2 is a high level depiction of label propagation in a video sequence based on one manually annotated frame, and this may be carried throughout a video based on more manual annotations (i.e., ground truth labels) (step 515).

A joint probability of pixel class labels can then be defined by equation 1)

$$P(Z) \propto \Pi_{\forall k, p, j} \Psi(Z_{k+d, T_{k+d, p}(j)}, Z_{k, p(j)}) \quad (1)$$

where Z is a set of discrete random variables $Z_{k,p(j)}$ taking values in the range 1 ... L corresponding to the class label of a pixel j in a patch p of frame k.

According to these embodiments, $\Psi$ is a potential favoring a same class prediction as at equation 2)

$$\psi(a, b) = \begin{cases} 1 - \delta & \text{if } a = b \\ \delta & \text{otherwise} \end{cases} \quad (2)$$

According to embodiments of the disclosure, δ is set manually depending on a complexity of videos to be processed. If a video is complex, δ is chosen to be smaller in order to have faster decay of label certainty, and larger for less complex video sequences.

Furthermore $Z_{k+d, T_{k+d,p}(j)}$ corresponds to a class label of a pixel j in a patch $T_{k+d,p}$ in frame k+d. Here $T_{k+d,p}$ corresponds to the best matching patch of frame k+d to patch p in frame. Finally, d is a constant which builds correspondences from the current frame to the previous frame or to the next frame when set to −1 and 1 respectively.

The aforementioned joint distribution can be represented as a factor graph tree as shown in FIG. 1A. The resulting factor graph is a tree structure, and message passing, see e.g., https://en.wikipedia.org/wiki/Factor_graph, can be used to obtain an exact inference of the marginal posterior for each variable $P(Z_{k,p(j)}=l)$.

Pixels j in overlapping patches may have different random variables assigned, and a final per pixel class distribution may be determined by summing over distributions of overlapping pixels as in equation 3)

$$R(k, i, l) = \frac{1}{K} \sum_{s.t. p(j)=i} P(Z_{k, p(j)} = l) \quad (3)$$

where K is a normalization constant determined based on K being the number of patches overlapping a particular pixel.

To calculate the best match, the highest cross correlation score of patch p in a window W×H around patch p in frame k+d as explained above, a cross-correlation algorithm implemented in CUDA is used, with timings based on experiments with an NVidia Titan X Maxwell GPU shown in Table 1.

TABLE 1

| Dataset | Resolution | # Labelled Frames | # Frames Used | # Neigh. Frames | # Aug. Frames | # Dataset Frames | # Classes | Mapping Time (sec) | Propagate Time (min) |
|---|---|---|---|---|---|---|---|---|---|
| CamVid | 960 × 720 | 701 | 701 | 9 | 10.4K | 10.4K | 11 | 20 | 0.4 |
| CityScape | 2048 × 1024 | 5000 | 2975 | 10 | 62.5K | 59.1K | 19 | 50 | 1.9 |
| Internal | 1936 × 1456 | 4500 | 141 | 10 | 2.9K | 2.9K | 11 | 55 | 1.8 |

Figure 3:
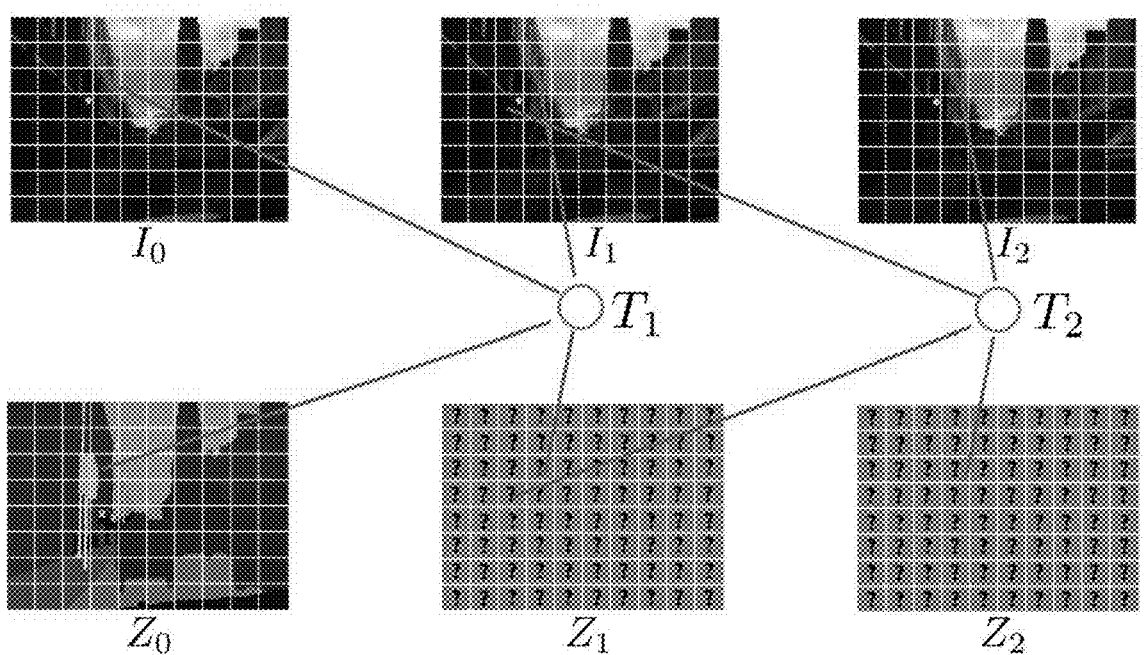
FIG. 3 shows a high level view of an induced tree structure created based on mapped variables within a video sequence.

FIG. 3 shows an exemplary high level view of an induced tree structure created based on patches within a video sequence.

An uncertainty difference between a labelled image of the forward model and a labelled image of the backward model may be determined in order to estimate a level of uncertainty of the assigned labels, i.e., an image label difference (step 520).

An optional fourth step of post-processing, e.g., "cleanup," may be undertaken, as will be described herein.

According to embodiments of the present disclosure, following creation of the forward and backward models, class label augmentation may be achieved using three steps. Firstly, for each pixel j in frame k, a most likely class label argmax$_l$,R(k, i, l') may be assigned. Next, for pixels where the most likely label has a probability lower than a threshold, for example, L+0.0001, a "void" label may be assigned to avoid mislabelling due to numerical error propagation, among others. Examples of labels for d=−1 and d=1 for one sequence from the CityScapes dataset are presented in rows (b) and (c) in FIG. 1B.

A final result is produced by taking a image label difference (i.e. assigning a class label if both frames agree and a "void" label if they disagree) as opposed to averaging the backward (d=−1) and forward (d=1) built structures as has been done to date.

Although more pixel labels may be obtained when using averaging, the Inventors have determined that using an image label difference can reduce erroneous labelling introduced by occlusions, dis-occlusions and/or erroneous patch correspondences. Therefore, overall accuracy can be increased.

To obtain instance labels, a similar procedure to class label propagation may be followed. Notably, some differences may also be implemented to the class label procedure, for example, when labelling instances, all pixels of noninstances may be assigned to a background class, and according to some embodiments, two steps of post-processing may be performed, as will be described in greater detail below. Notably, as the majority of the state-of-the-art instance segmentation algorithms require high quality instance labels, the inventors have determined the following exemplary two step instance label post-processing algorithm which can be implemented to improve quality.

During the first step, regions of void, background and instance labels (in this order) comprising an area of less than 20 pixels and which are surrounded by a single instance label are filled in with the surrounding class label. This step is motivated by the observation that a propagation algorithm may mis-classify greater than 95% of small regions which are surrounded by another (different) instance label and the void and background regions may be processed first since they are more likely to have been introduced by mistake. Note that the size of the regions (20 pixels) may be chosen in order to allow propagation of car instance labels of more than 20 pixels, but that this value may be more or fewer pixels as desired.

During the second step, regions of e.g., car instance labels, are grown using the following dilation procedure. Any pixel in the background class whose immediate (11 pixel) neighbourhood region consists of only one instance class label is assigned this label. This dilation procedure was chosen because of the following properties of the propagation algorithm: (a) the most frequent type of error is misclassifying an instance class as a background class, (b) car boundaries with the background are mostly labelled correctly, but the most common error is the presence of background-labelled regions within the vehicle boundary.

The above steps of the post-processing are iterated until convergence.

Figure 1C:
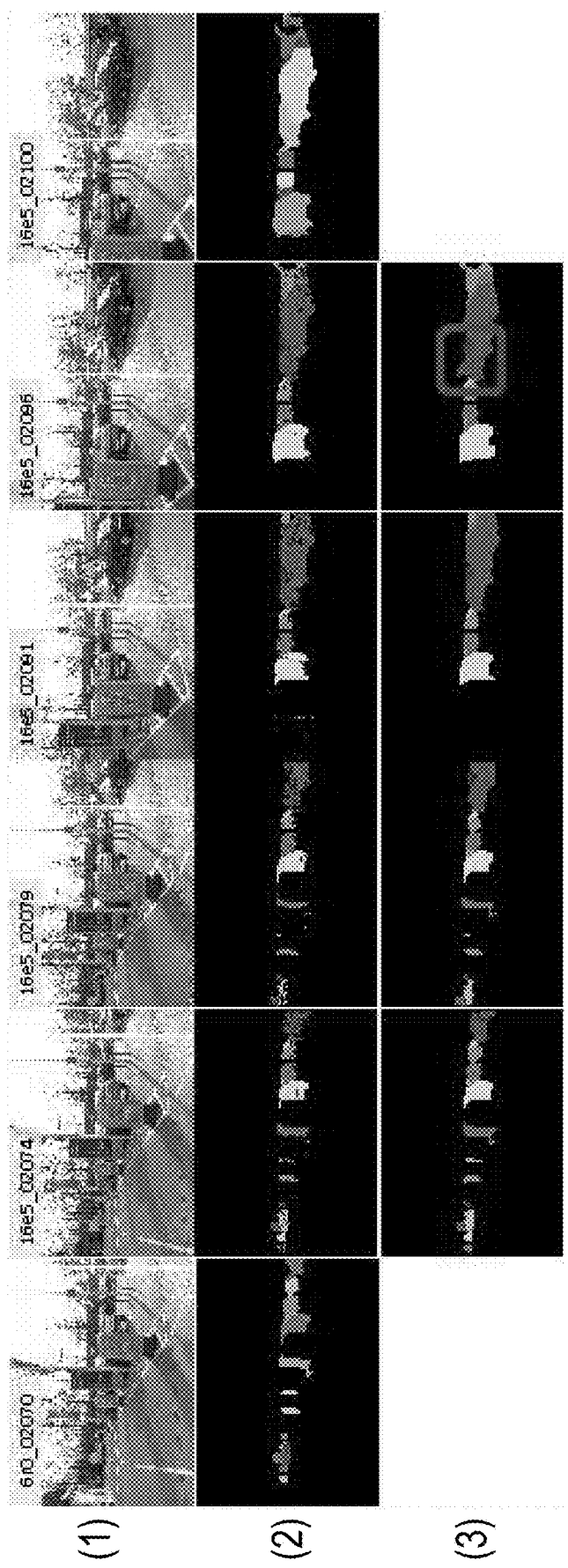
FIG. 1C shows several examples of label propagation using techniques of the present disclosure, including following a post-processing (e.g., clean-up) procedure.

The results of the post-processing can be seen at FIG. 1C, in the row (3). The white noise pixels seen in the 3rd row of FIG. 1C.

Figure 5A:
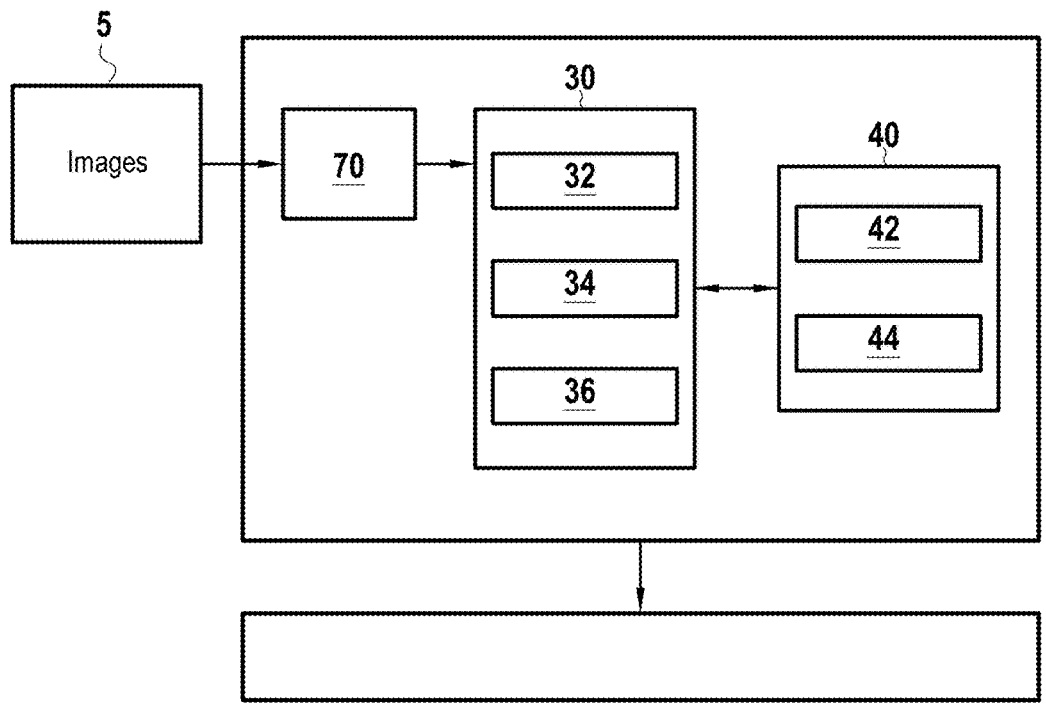
FIG. 5A is an illustration of an image processor or processing system according to an embodiment of the present disclosure.

FIG. 5A shows an image processor or processor system 10 useful for implementing embodiments of the present disclosure. The image processor or processor system 10 can be implemented as for example one or more integrated circuits having hardware such as circuit blocks dedicated to each of the parts shown, or can be implemented for example as software modules executed by a general purpose processor in sequence, as in a server. Notably, a graphics processor (GPU) may provide the primary processing power for executing methods of the present disclosure. For example, graphics processor from NVIDIA and/or AMD may be implemented.

The parts shown include an input interface 20 for receiving an input image or image stream (such as frames of a video, in real time or non real time) from an image source device 5 such as a video camera or an optical disk such as a DVDROM or a CDROM or a solid state memory device such as a USB stick. The images or frames of the video sequence are stored in part 34 of a memory 30. Also input to the system are one or more labeled images that are stored in part 36 of memory 30. In addition a model of the images is stored a part 32 of the memory. The model may be a joint model of a sequences of frames and their labels. The model may be a generative probabilistic model of a sequence of frames and their corresponding labels. The model may be a sequential generative model that uses one image to generate a subsequent or previous image. The model may be a sequential generative latent variable model. For example, the model used can be a tree-type model. The processor system 10 also has an inference computational part 40. This part 40 is for carrying out any of the methods of the present disclosure involving the inference step. For example the part 40 may include an E step and an M step computational part (42, 44 respectively) which process the image data in memory parts 34 and 36 in order to propagate the labels.

A device 55 can be provided for interpreting or taking action based on an output of the present disclosure. Such an output can be used to provide an alarm (e.g. derived from the labeling of the images with the labeling associated with a pedestrian or in conjunction with a further algorithm that detects pedestrians in images and uses the labeling of the present disclosure as additional information as to the content of images to make the identification of pedestrians more accurate. The output can also be configured to interact with systems of a vehicle in order to cause, for example, a braking effect of a driver assistance system, a steering effect of a driver assistance system, and/or an acceleration effect of a driver assistance system, among others.

In a further aspect, the present disclosure relates to a system for processing video data and adapted for propagating label information across the plurality of images. The different components of the system may comprise processing power for performing their function. The functionality of the different components of the system 300 or different method steps of the method 500 of FIG. 4 may be implemented in separate or a joint processing system 1500 such as shown in FIG. 5B.

Figure 5B:
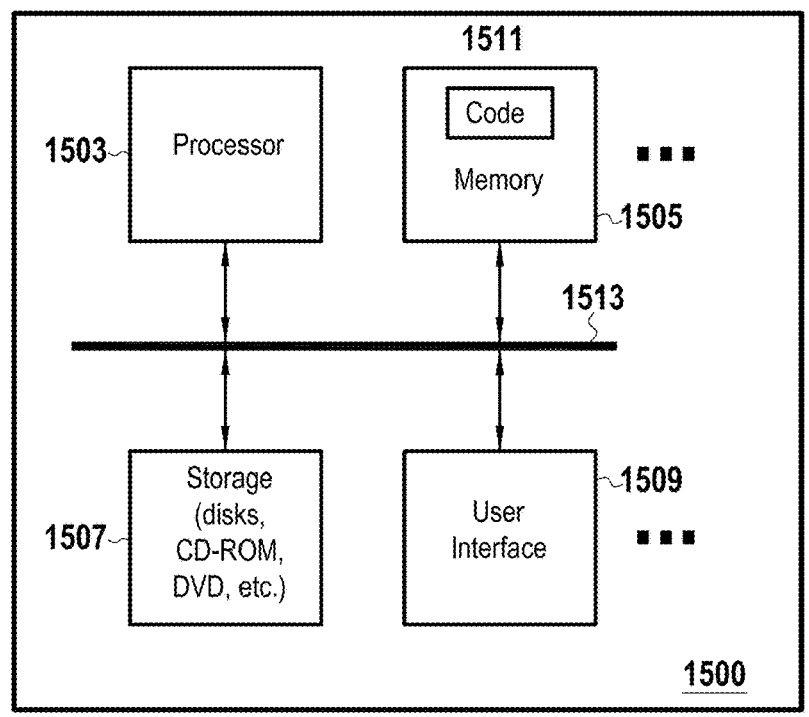
FIG. 5B is an illustration of a processing system whereon a method according to embodiments of the present disclosure can be implemented.

FIG. 5B shows one configuration of processing system 1500 that includes at least one programmable processor 1503 coupled to a memory subsystem 1505 that includes at least one form of memory, e.g., RAM, ROM, and so forth. It is to be noted that the processor 1503 or processors may be a general purpose, or a special purpose processor, and may be for inclusion in a device, e.g., a chip that has other components that perform other functions. Thus, one or more aspects of the present disclosure can be implemented in digital electronic circuitry, or in computer hardware, firmware, software, or in combinations of them. The processing system may include a storage subsystem 1507 that has at least one disk drive and/or CD-ROM drive and/or DVD drive. In some implementations, a display system, a keyboard, and a pointing device may be included as part of a user interface subsystem 1509 to provide for a user to manually input information. Ports for inputting and outputting data also may be included. More elements such as network connections, Interfaces to various devices, and so forth, may be included, but are not illustrated in FIG. 5B. The various elements of the processing system 1500 may be coupled in various ways, including via a bus subsystem 1513 shown in FIG. 5B for simplicity as a single bus, but will be understood to those in the art to include a system of at least one bus. The memory of the memory subsystem 1505 may at some time hold part or all (in either case shown as 1511) of a set of instructions that when executed on the processing system 1500 implement the steps of the method embodiments described herein. Thus, while a processing system 1500 such as shown in FIG. 5B is prior art, a system that includes the instructions to implement aspects of the methods for processing the video data is not prior art, and therefore FIG. 5B is not labelled as such.

The present disclosure also includes a computer program product which provides the functionality of any of the methods according to the present disclosure when executed on a computing device. Such computer program product can be tangibly embodied in a carrier medium carrying machine-readable code for execution by a programmable processor. The present disclosure thus relates to a carrier medium carrying a computer program product that, when executed on computing means, provides instructions for executing any of the methods as described above. The term "carrier medium" refers to any medium that participates in providing instructions to a processor for execution. Such a medium may take many forms, including but not limited to, non-volatile media, and transmission media. Non volatile media includes, for example, optical or magnetic disks, such as a storage device which is part of mass storage. Common forms of computer readable media include, a CD-ROM, a DVD, a flexible disk or floppy disk, a tape, a memory chip or cartridge or any other medium from which a computer can read. Various forms of computer readable media may be involved in carrying one or more sequences of one or more instructions to a processor for execution. The computer program product can also be transmitted via a carrier wave In a network, such as a LAN, a WAN or the Internet. Transmission media can take the form of acoustic or light waves, such as those generated during radio wave and infrared data communications. Transmission media include coaxial cables, copper wire and fibre optics, including the wires that comprise a bus within a computer.

Based on an augmented set of labelled video frames, a classifier, for example, for use in a vehicle providing driver assistance, may be trained, such that human-level understanding of traffic scenes from camera images anywhere in the world may be obtained by the onboard classifier and driver assistance systems.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

The method is described in terms of a single cell. However, it may be easily adapted for batteries having multiple cells. Moreover it may also refer to other cell types than lithium-ion cells.

What is claimed is:

1. A method for processing video data comprising a plurality of image frames, the plurality of image frames having an earlier and later frame of a video sequence, and having a label for a region or patch in the earlier frame and a corresponding region or patch in the later image frame, the method comprising:
    obtaining a forward model and a backward model of the plurality of image frames;
    processing the forward model and the backward model to propagate at least one label in the region or patch to at least one other image frame of the video sequence, using a probabilistic method for estimating the label in the at least one other image frame in forward and backward correspondences, wherein, during the processing, a pixel having a most likely label with a probability lower than a threshold value is assigned a predetermined generic label; and
    generating a labelled result for any given image frame by applying an image label difference, based on label uncertainty between the forward model and backward model propagated labels, to the given image frame.

2. The method according to claim 1, wherein the propagated label is a class label.

3. The method according to claim 1, wherein the propagated label is an instance label.

4. The method according to claim 3, comprising:
    after the processing, assigning pixels within an image frame having no instance label to a background class;
    dilating the pixels of the background class surrounded by pixels having an assigned instance label into a group of pixels; and
    reassigning the assigned instance label to the group of pixels when the group of pixels is smaller than a threshold size.

5. The method according to claim 4, wherein the threshold size is 40 pixels, better 30 pixels, still better 20 pixels.

6. The method according to claim 5, wherein the video sequence is a 360 degree video sequence.

7. The method according to claim 6, wherein the 360 degree video sequence is stored as equirectangular images.

8. The method according to claim 1, wherein the plurality of image frames have a pixel resolution greater than or equal to 960×720.

9. The method according to claim 1, wherein the forward and backward models comprise a probabilistic graphical model.

10. The method according to claim 1, wherein at least one of the forward model and the backward model is an undirected graphical model.

11. The method according to claim 1, wherein the obtaining the forward model and the backward model comprises matching between a patch in an image frame k of the plurality of image frames and patches in one or more previous or subsequent image frames k+d of the plurality of image frames, wherein a correlation operation between the patch k and the patch k+d is defined as $$T_{k,j} = \text{MATCH}(I_{k,j}, I_{k+d}, W_j) = \text{argmin}_{j' \text{ in } W_j} \sum_{\forall i,c} (I_{k+d}(p'(i, c)) - I_k(p(i, c))^2$$

where $W_j$ is a fixed window around location j, $I_k(p(i, c))$ indicates a pixel i value in a patch p centred on location j of image $I_k$ in color channel $c \in \{R, G, B\}$ and $I_{k+d}(p'(i, c))$ indicates pixel i value in patch p' centered around location j' in image $I_{k+d}$ in color channel c.

12. The method according to claim 1, wherein the image label difference indicates whether the forward model and backward model propagated labels agree on a label to assign to the region or patch.

13. The method according to claim 1, wherein the generating comprises assigning a void label if the image label difference is such that the forward model and backward model propagated labels disagree on a label to assign to the region or patch.

14. The method according to claim 1, wherein at least one of the forward model and the backward model comprises a built correspondence tree of propagated labels.

15. A method for processing video data comprising a plurality of image frames, the plurality of image frames having an earlier and later frame of a video sequence, and having a label for a region or patch in the earlier frame and a corresponding region or patch in the later image frame, the method comprising:
    obtaining a forward model and a backward model of the plurality of image frames;
    processing the forward model and the backward model to propagate at least one label in the region or patch to at least one other image frame of the video sequence, using a probabilistic method for estimating the label in the at least one other image frame in forward and backward correspondences, wherein, during the processing, a pixel having a most likely label with a probability lower than a threshold value is assigned a predetermined generic label;

generating a labelled result for any given image frame by applying an image label difference, based on label uncertainty between the forward model and backward model propagated labels, to the given image frame; and using the labelled result image frames for training an image classifier.

16. A system for processing video data comprising a plurality of image frames, the plurality of image frames having an earlier and later frame of a video sequence, having a label for a region or patch in the earlier image frame and a corresponding region or patch in the later image frame, the system comprising:

a memory that stores a forward model of the plurality of image frames and a backward model of the plurality of image frames;

a processor configured to apply the model to propagate at least one label of the region or patch to at least one other image frame of the video sequence, using a probabilistic method for estimating the label in the at least one other image in forward and backward correspondences:

assign a void label to a pixel having a most likely label with a probability lower than a threshold value; and generate a labelled result for any given image frame by applying an image label difference, based on label uncertainty between the forward model and backward model propagated labels, to the given image frame.

17. The system according to claim 16, wherein the forward model and the backward model are probabilistic graphical models.

18. The system according to claim 16, wherein the processor is configured to assign pixels within an image frame having no instance label to a background class, dilate the pixels of the background class surrounded by pixels having an assigned instance label into a group of pixels, and reassigning the assigned instance label to the group of pixels when the group of pixels is smaller than a threshold size.

* * * * *